United States Patent
Le et al.

(10) Patent No.: US 7,272,883 B2
(45) Date of Patent: Sep. 25, 2007

(54) METHODS OF FORMING AN ELECTRICAL CONNECTION IN A MAGNETIC HEAD USING A DAMASCENE PROCESS

(75) Inventors: Quang Van Le, San Jose, CA (US); Jeffrey Scott Lille, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 287 days.

(21) Appl. No.: 10/651,532

(22) Filed: Aug. 29, 2003

(65) Prior Publication Data

US 2005/0047013 A1   Mar. 3, 2005

(51) Int. Cl.
G11B 5/127 (2006.01)
H04R 31/00 (2006.01)

(52) U.S. Cl. .............................. 29/603.16; 29/603.13; 29/603.15; 29/603.18; 29/605; 216/62; 216/65; 216/66; 360/122; 360/126; 360/317; 427/127; 427/128; 451/5; 451/41

(58) Field of Classification Search ............. 29/603.13, 29/603.14–603.16, 603.18, 605; 360/122, 360/126, 317; 427/127, 128; 451/5, 41; 216/62, 65, 66
See application file for complete search history.

(56) References Cited

U.S. PATENT DOCUMENTS

| | | | |
|---|---|---|---|
| 3,702,906 A | 11/1972 | Camras | |
| 5,450,263 A | 9/1995 | Desaigoudar et al. | |
| 6,069,853 A | 5/2000 | Novotny et al. | |
| 6,130,864 A | 10/2000 | Burroughs | |
| 6,317,280 B1 | 11/2001 | Nakajima et al. | |
| 6,455,174 B1 | 9/2002 | Takao et al. | |
| 6,948,231 B2 * | 9/2005 | Hsiao et al. | 29/603.25 |
| 7,023,660 B2 * | 4/2006 | Hsiao et al. | 360/128 |

(Continued)

FOREIGN PATENT DOCUMENTS

JP  02098882 A  * 4/1990

(Continued)

OTHER PUBLICATIONS

"Fabrication process for a trapezoidal main pole for single-pole-type heads"; Okada, T.; Kawato, Y.; Haginoya, C.; unokawa, I.; Etoh, K.; Fuyama, M.; Magnetics, IEEE Transactions on vol. 38, Issue 5, Part 1; Sep. 2002; pp. 2249-2252.*

(Continued)

Primary Examiner—Paul D. Kim
(74) Attorney, Agent, or Firm—John J. Oskorep, Esq.; Rambod Nader

(57) ABSTRACT

In one illustrative example disclosed, a method for use in making a magnetic head involves forming a thermal-assist heater for the magnetic head; forming a plurality of coil layers of a write coil using a damascene process; and simultaneously forming an electrical connection to the thermal-assist heater in the same damascene process used to form the write coil. Advantageously, fabrication steps are reduced using a parallel process that provides for relatively small dimensions and reduces the possibility of electrical shorting. The method may be alternatively used to form an electrical connection to any other suitable electrical device for the magnetic head, such as an electrical lapping guide (ELG) or other component.

18 Claims, 11 Drawing Sheets

U.S. PATENT DOCUMENTS

2003/0218835 A1* 11/2003 Hsiao et al. ................ 360/317
2005/0024764 A1*  2/2005 Hsiao et al. ................ 360/123

FOREIGN PATENT DOCUMENTS

JP          08072292 A  *  3/1996
JP          2002-074606    3/2002

OTHER PUBLICATIONS

H. J. Rosen and D. A. Thompson, "Thermally-Assisted Magnetic Recording", IBM Technical Disclosure Bulletin (TDB), Oct. 1997, vol. 40, No. 10, p. 65.

* cited by examiner

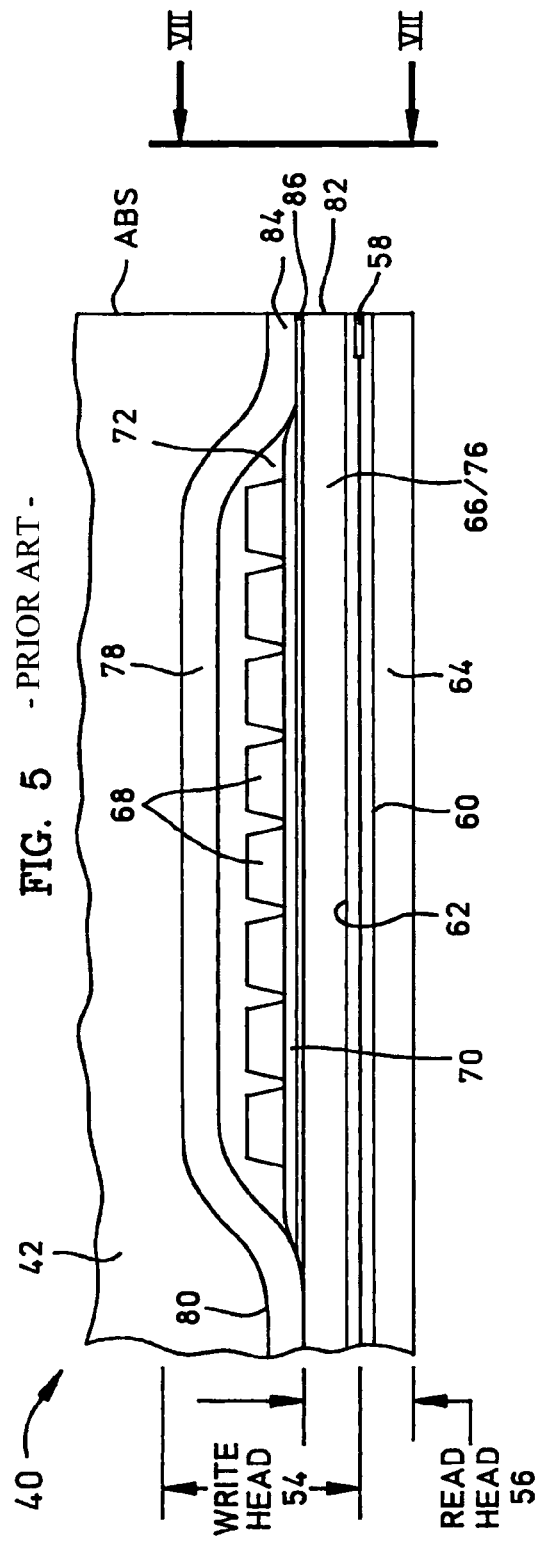
FIG. 5 - PRIOR ART -
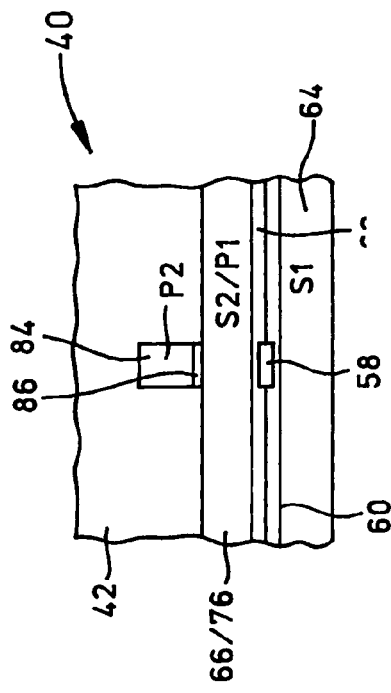
FIG. 7 - PRIOR ART -

- PRIOR ART -

- PRIOR ART -

METHODS OF FORMING AN ELECTRICAL CONNECTION IN A MAGNETIC HEAD USING A DAMASCENE PROCESS

BACKGROUND OF THE INVENTION

1. Field of the Invention

This invention relates generally to methods of making magnetic heads of disk drives, and more particularly to a method involving a simultaneous damascene-based fabrication of a write coil and an electrical connection to an electrical device (such as a thermal-assist heater).

2. Description of the Related Art

The data storage industry continues to improve or increase the amount of data that can be stored on magnetic disks and to more easily design magnetic heads which can adequately read from and write data to these disks. One promising technique to increase the disk storage capacity is heat-assisted magnetic recording (HAMR), which may also be referred to as optically-assisted magnetic recording or thermally-assisted magnetic recording. Such a technique utilizes a recording medium that can store relatively more data since it has a higher coercivity than other types of conventional media. A higher coercivity, however, means that the platter tends to resist reacting to magnetic fields at typical operating temperatures. Therefore, it is difficult to write data to such media at typical operating temperatures. To sufficiently write data to such high coercivity media, a disk drive needs to heat up a portion of the disk to lower its coercivity as the write head writes data to it.

Techniques to provide a thermal heater in a magnetic write head for assisting in the writing of data, referred to in the present application as a "thermal-assist heater", have been devised. However, a robust process and design for fabricating an electrical connection to such thermal-assist heaters should not add additional processing steps if possible. A suitable electrical connection process should reduce the possibility of shorting and damage to neighboring components of the magnetic head. As design-points in magnetic heads are in sub-micron dimensions, the available spacing becomes limited accordingly. Thus, the ability to reduce or minimize such undesirable occurrences is important because it will translate into higher device yields during manufacturing. A thoughtful design should consider the path, the location, and the effects of the electrical connection to nearby components during its fabrication and to itself during subsequent processes. Finally, an electrical connection should be fabricated such that it can be incorporated into the fabrication of existing components to minimize increasing the number of processing steps.

Accordingly, what are needed are methods of forming electrical connections in magnetic heads (e.g. connections to thermal-assist heaters) which overcome the shortcomings inherent in present-day methods.

SUMMARY

A method for use in making a magnetic head includes the steps of forming a plurality of coil layers of a write coil using a damascene process; and simultaneously forming an electrical connection to an electrical device in the same damascene process used to form the write coil. Advantageously, fabrication steps are reduced using a parallel process that provides for relatively small dimensions and reduces the possibility of electrical shorting. The method may be used to form an electrical connection to any suitable device for the magnetic head, such as a thermal-assist heater or an electrical lapping guide (ELG).

BRIEF DESCRIPTION OF THE DRAWINGS

For a fuller understanding of the nature and advantages of the present invention, as well as the preferred mode of use, reference should be made to the following detailed description read in conjunction with the accompanying drawings:

FIG. 5 is a partial elevation view of the slider and magnetic head as seen in plane V-V of FIG. 2, where the magnetic head includes a magnetoresistive (MR) read sensor and a non-pedestal type write head;

FIG. 7 is a partial ABS view of the slider taken along plane VII-VII of FIG. 5 to show the read and write elements of the magnetic head;

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Inventive techniques have been devised for the robust design of an electrical connection to a thermal-assist heater (or other suitable electrical device) of a magnetic head. This electrical connection design reduces the possibility of shorting and damage to neighboring components of the magnetic head. As design-points in magnetic heads are in sub-micron dimensions, the available spacing becomes limited accordingly. Thus, the ability to reduce or minimize such undesirable occurrences is important because it translates into higher yields during manufacturing. As will be described, the electrical connection is also fabricated so as to be incorporated into the fabrication of existing components (i.e. the write coil) to reduce or minimize the number of processing steps.

Figure 1:
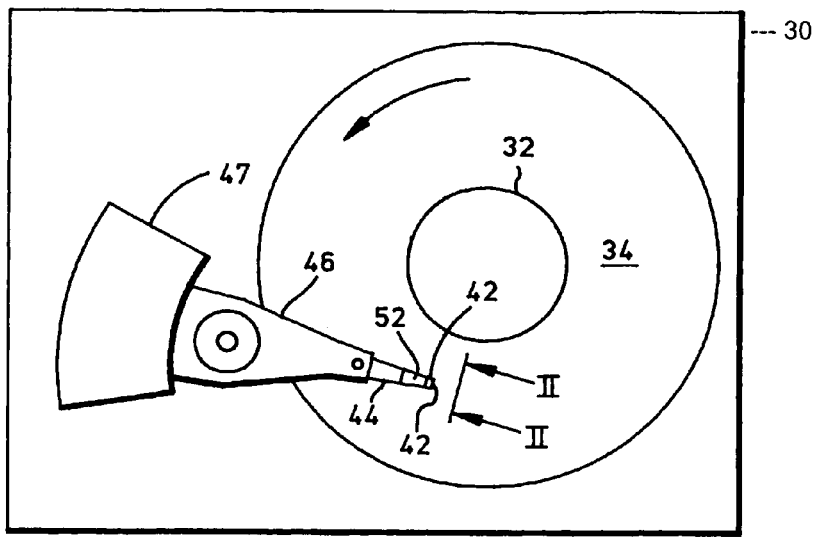
FIG. 1 is a planar view of an exemplary magnetic disk drive.
Figure 2:
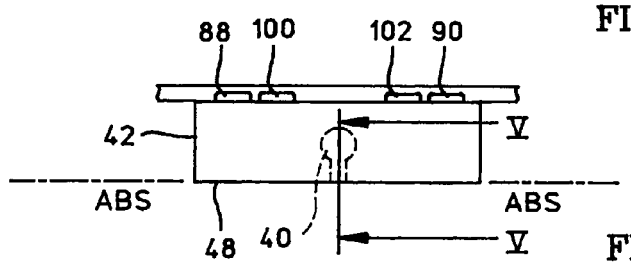
FIG. 2 is an end view of a slider with a magnetic head of the disk drive as seen in plane II-II.
Figure 3:
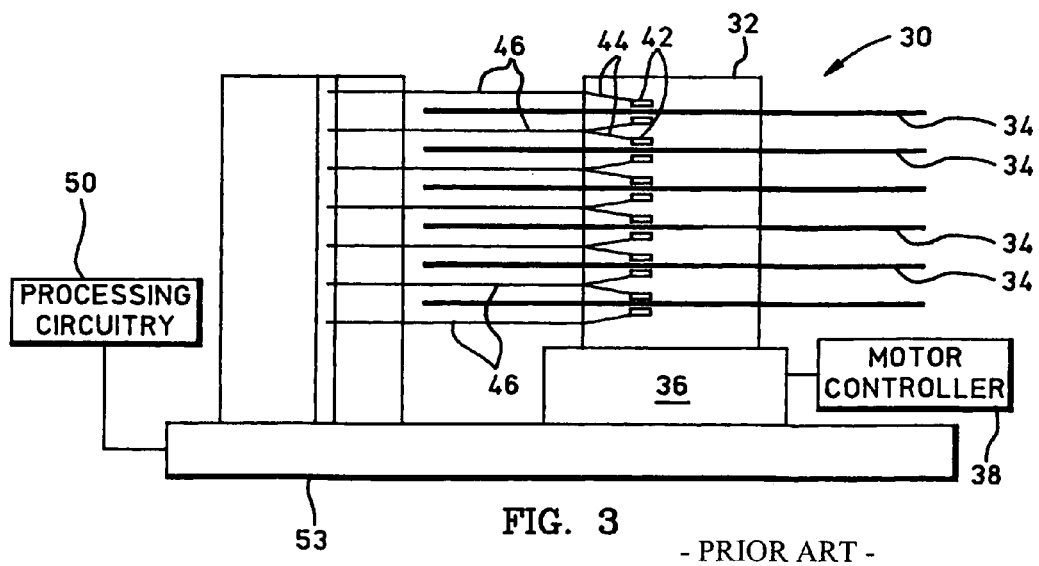
FIG. 3 is an elevation view of the magnetic disk drive wherein multiple disks and magnetic heads are employed.

Referring now to the drawings, wherein like reference numerals designate like or similar parts throughout the several views, there is illustrated in FIGS. 1-3 a conventional magnetic disk drive 30. Disk drive 30 includes a spindle 32 that supports and rotates a magnetic disk 34. Spindle 32 is rotated by a motor 36 that, in turn, is controlled by a motor controller 38. A horizontal combined magnetic head 40 for reading and recording is mounted on a slider 42. Slider 42 is supported by a suspension 44 and actuator arm 46. A plurality of disks, sliders and suspensions may be employed in a large capacity direct access storage device (DASD), as shown in FIG. 3. Suspension 44 and actuator arm 46 position slider 42 to locate magnetic head 40 in a transducing relationship with a surface of magnetic disk 34. When disk 34 is rotated by motor 36, slider 42 is supported on a thin (typically, 0.05 μm) cushion of air (air bearing) between the disk and an air bearing surface (ABS) 48.

Figure 4:
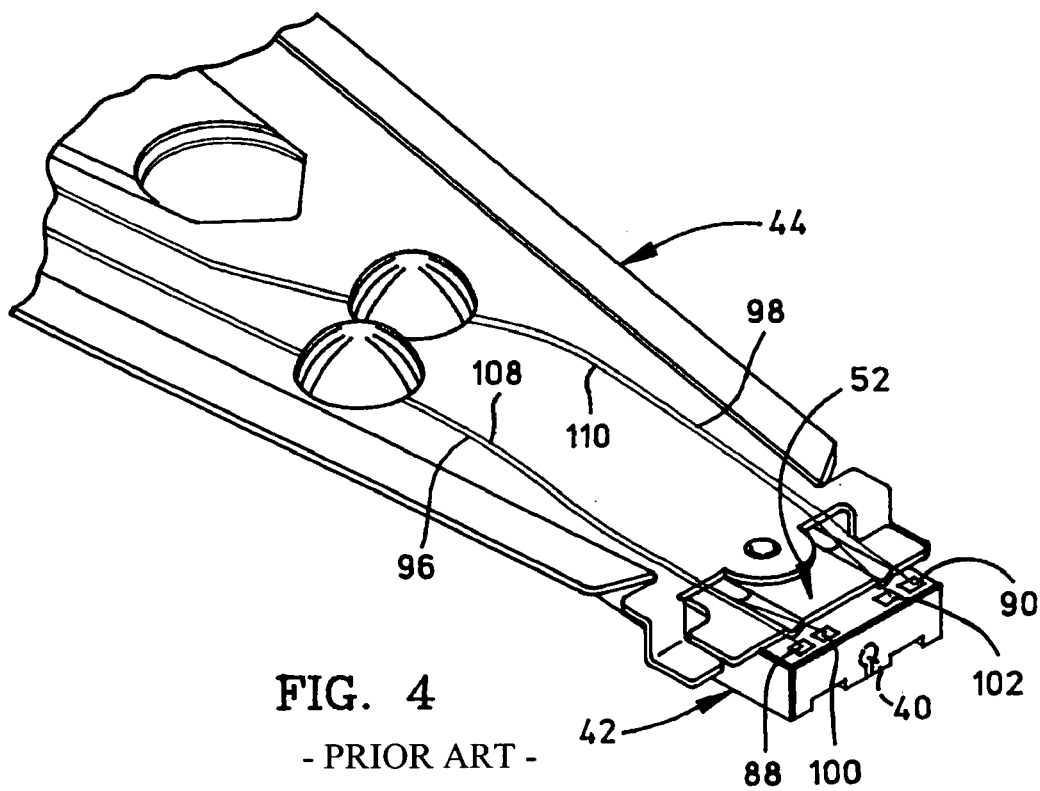
FIG. 4 is an isometric illustration of an exemplary suspension system for supporting the slider and magnetic head.

Magnetic head 40 may be employed for writing information to multiple circular tracks on the surface of disk 34, as well as for reading information therefrom. Processing circuitry 50 exchanges signals representing such information with magnetic head 40, provides motor drive signals, and also provides control signals for moving slider 42 to various tracks. In FIGS. 1 and 4, slider 42 is shown mounted to a head gimbal assembly (HGA) 52 that is mounted to suspension 44. All of the above components are supported on a base 53.

FIG. 5 is a side cross-sectional elevation view of a conventional merged magnetoresistive (MR) head 40 as viewed in plane V-V of FIG. 2. Magnetic head 40 has a write head portion 54 ("non-pedestal type") and a read head portion 56. The read head portion includes an MR sensor 58. MR sensor 58 is sandwiched between first and second gap layers 60 and 62 that are, in turn, sandwiched between first and second shield layers 64 and 66. In response to external magnetic fields, the resistance of MR sensor 58 changes. A sense current conducted through MR sensor 58 causes these resistance changes to be manifested as potential changes, which are processed by the processing circuitry 50 shown in FIG. 3.

Figure 6:
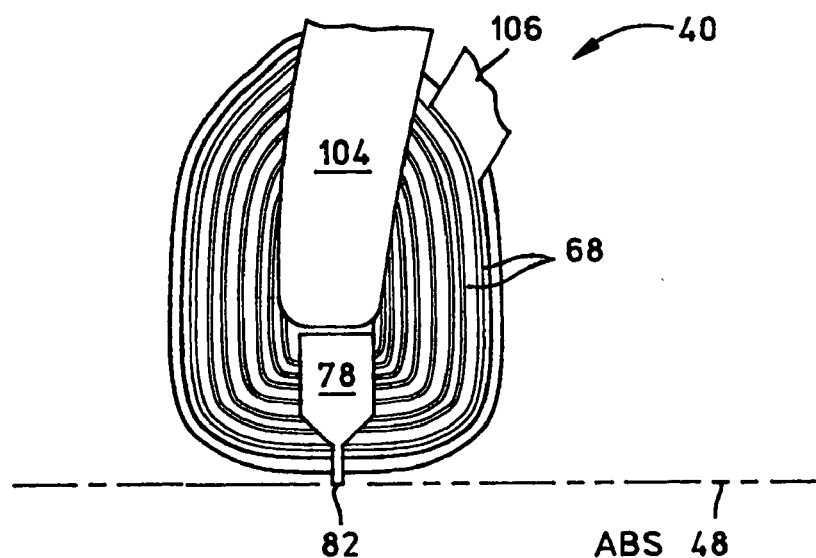
FIG. 6 is a top view of the second pole piece and coil layer, a portion of which is shown in FIG. 5, with all insulation material removed.

Write head portion 54 of the head includes a coil layer 68 sandwiched between first and second insulation layers 70 and 72. First and second insulation layers 70 and 72 are referred to as an "insulation stack". Coil layer 68 and first and second insulation layers 70 and 72 are sandwiched between first and second pole pieces 76 and 78. First and second pole pieces 76 and 78 are magnetically coupled at a back gap 80, and have first and second pole tips 82 and 84 that are separated by a non-magnetic gap layer 86 at the ABS. Note that coil layer 68 is contained completely above non-magnetic gap layer 86 under and within second pole piece 78. As shown in FIGS. 2 and 4, first and second solder connections 88 and 90 connect leads (not shown) from MR sensor 58 to leads 96 and 98 on suspension 44; third and fourth solder connections 100 and 102 connect leads 104 and 106 from write coil 68 (see FIG. 6) to leads 108 and 110 on suspension 44.

Figure 8:
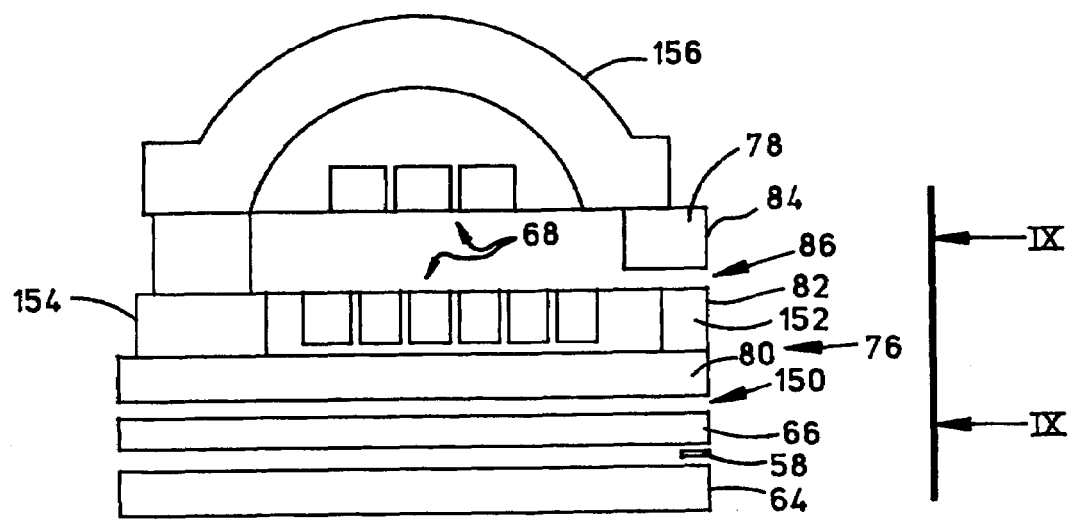
FIG. 8 is a partial elevation view of the slider and magnetic head as seen in plane V-V of FIG. 2, where the magnetic head includes an MR or giant magnetoresistive (GMR) read sensor and a pedestal-type write head.
Figure 9:
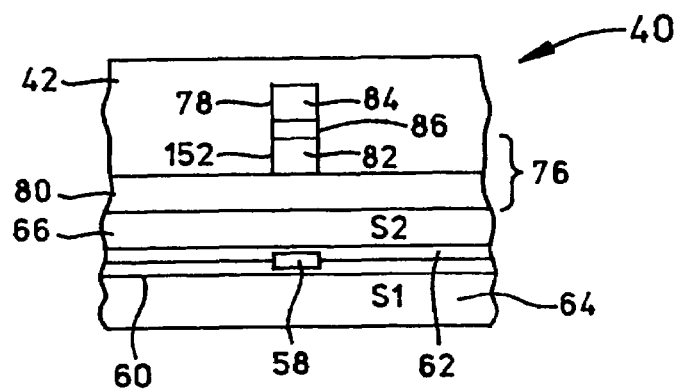
FIG. 9 is a partial ABS view of the slider taken along plane IX-IX of FIG. 8 to show the read and write elements of the magnetic head of FIG. 8.

FIG. 8 is a partial cross-sectional view of another conventional slider and magnetic head ("pedestal type") as viewed in plane V-V of FIG. 2, where the magnetic head may include an MR or a GMR sensor. FIG. 9 is a partial ABS view of the slider taken along plane IX-IX of FIG. 8 to show read and write elements of this magnetic head. Although many components in this magnetic head are the same as those in FIG. 5, some differences are apparent. For one, the head in FIG. 8 includes a pedestal-type write head wherein first pole piece 76 includes a first pole piece layer 80 and a plated pedestal 152. Pedestal 152 is formed on first pole piece layer 80 by electroplating and is made of a magnetic material having a high magnetic moment. Non-magnetic gap layer 86 separates pedestal 152 from second pole piece 78. Similar to pedestal 152, a back gap pedestal 154 is formed on first pole piece layer 80 but in the back gap region. A third pole piece 156, which is formed in an arcuate fashion with a front end formed on top of second pole piece 78, serves as a magnetic flux connecting layer. Conventional write coils 68 of FIG. 8 are formed within the magnetic head in a different manner than that in FIG. 5. In particular, a first layer of coil turns are formed below non-magnetic gap layer 86 in between pedestals 152 and 154 and a second layer of coil turns are formed above second pole piece 78 within an arcuate spacing formed by third pole piece 156. Other differences from that in FIG. 5 are that shield layer 66 and first pole piece layer 80 are not common layers; they are separate. A non-magnetic separating layer 150 is formed between shield layer 66 and first pole piece layer 80.

Figure 10:
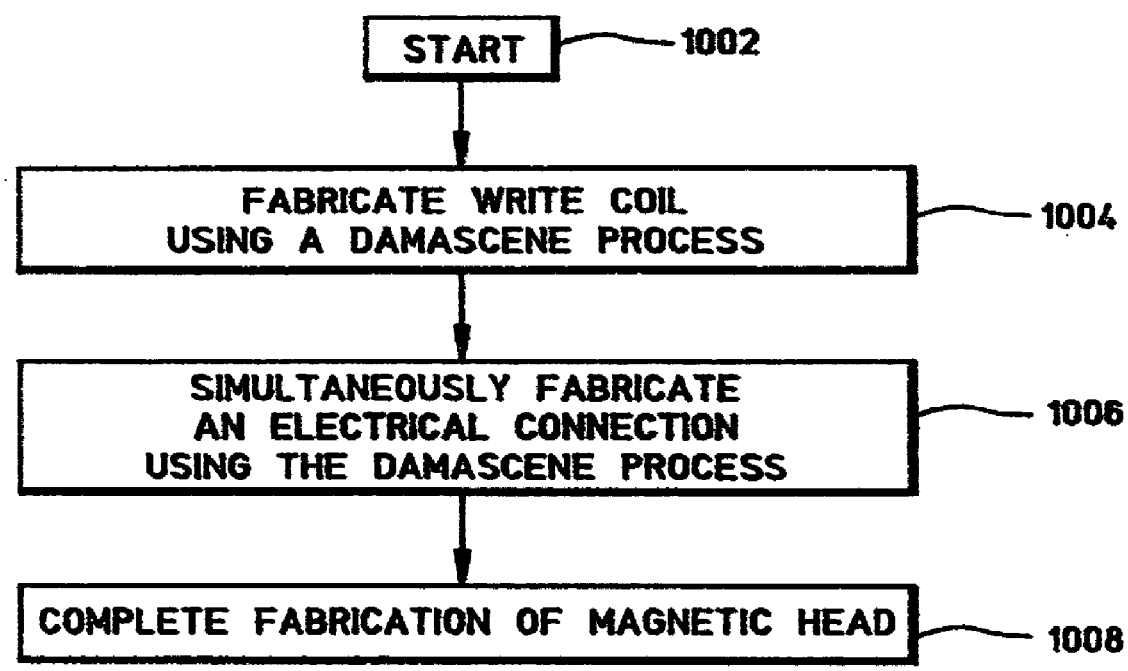
FIG. 10 is a flowchart which describes a general method for use in making a magnetic head in accordance with techniques of the present invention.

Referring now to FIG. 10, a flowchart which describes a general method for use in making a magnetic head in accordance with techniques of the present invention is shown. Beginning at a start block 1002 of FIG. 10, a write coil of a magnetic head is fabricated using a damascene process (step 1004). Simultaneously with the fabrication of the write coil, an electrical connection in the magnetic head is fabricated in the same damascene process used to form the write coil (step 1006). This electrical connection may be for coupling to any suitable electrical device other than a read sensor of the magnetic head. For example, the electrical connection may be for coupling to a thermal-assist heater. A thermal-assist heater is typically used for heating either the media to be written to or part of the magnetic head to cause protrusion. As another example, the electrical connection may be for coupling to an electrical lapping guide (ELG). To complete the process, remaining components are fabricated to complete the formation of the magnetic head, using conventional or other suitable processes (step 1008).

FIGS. 11-23 are illustrations of partially-constructed magnetic heads for describing a more detailed method of the present invention in a step-by-step fashion. Although this method describes details pertaining to a longitudinal magnetic recording head design (LMRD), it will be apparent to those ordinarily skilled in the art and appreciated that the method is applicable to a perpendicular magnetic recording head design (PMRD) as well. Also, although the following method describes details pertaining to an electrical connection to a thermal-assist heater, it will be apparent and appreciated that the method is applicable to form an electrical connection to any other suitable electrical device, such as an electrical lapping guide (ELG) or other component.

Figure 11:
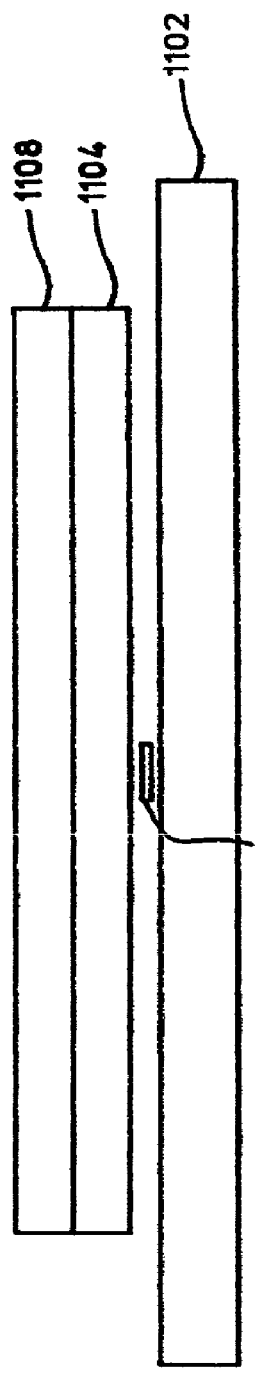
FIG. 11 is a first one of several views of FIGS. 11-23 which show a partially-constructed magnetic head for describing an example of a method of the present invention, showing in particular the formation of a first pole piece of the magnetic head.
Figure 12:
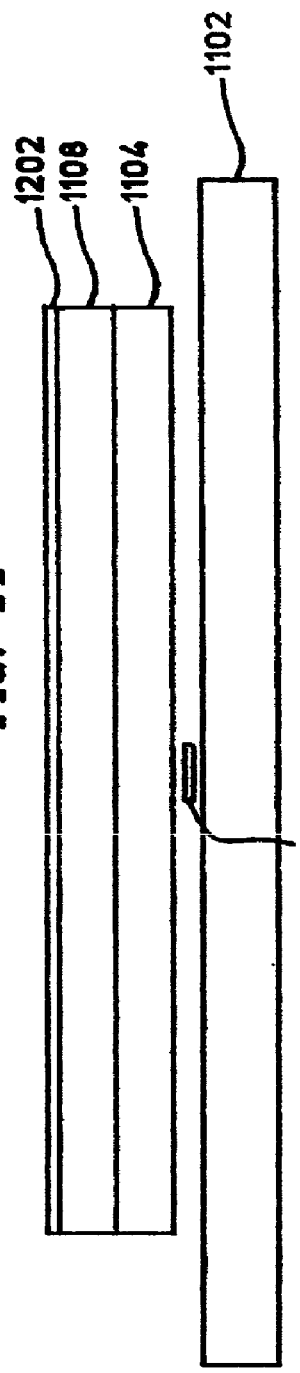
FIG. 12 is a second one of the several views of FIGS. 11-23, which is the same as FIG. 11 except that a gap layer is formed over the first pole piece.

Beginning with FIG. 11, what is shown in cross-section is the formation of a first shield layer 1102, a second shield layer 1104, a read sensor 1106 between first and second shield layers 1102 and 1104 (embedded within surrounding insulator materials), and a first pole piece layer 1108 formed over second shield layer 1104 (which is separated by a thin insulative layer not visible in FIG. 11 and the remaining figures). Read sensor 1106 is used for reading data from a magnetic disk and may be a magnetoresistive (MR) sensor, a giant MR (GMR) sensor, or other suitable sensor type. First pole piece layer 1108 may be made of any suitable magnetic material, preferably one with a relatively high magnetic moment, such as various compositions of NiFe alloys, CoFe alloys, or FeAlN, with the inclusion of other common additives or dopants to control its material properties. In FIG. 12, it is shown that a gap layer 1202 is then deposited over this first pole piece layer 1108. Gap layer 1202 is a very thin layer which may be made of alumina ($Al_2O_3$) or other suitable non-magnetic material.

Figure 13:
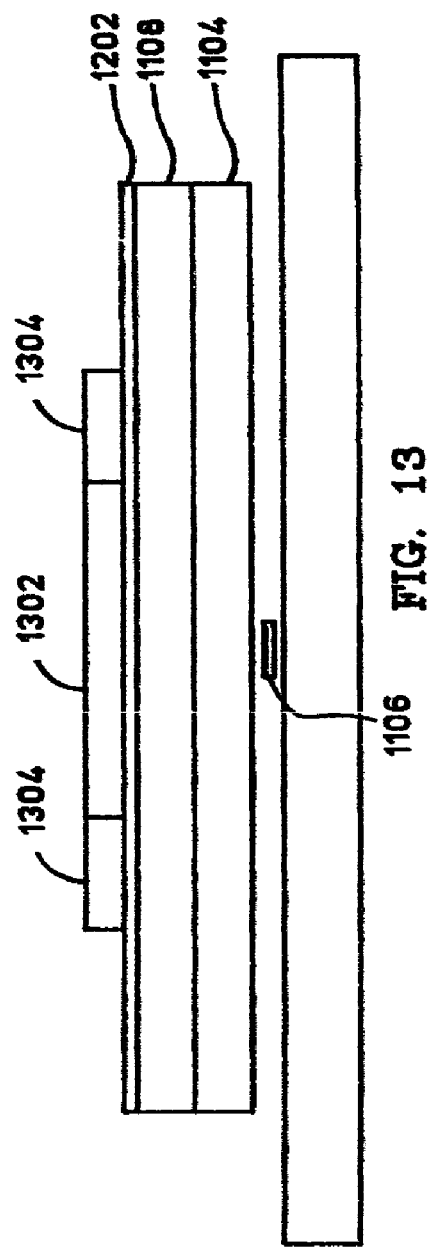
FIG. 13 is a third one of the several views of FIGS. 11-23, which is the same as FIG. 12 except a thermal-assist heater and electrical contacts thereto are formed over the gap layer.
Figure 14:
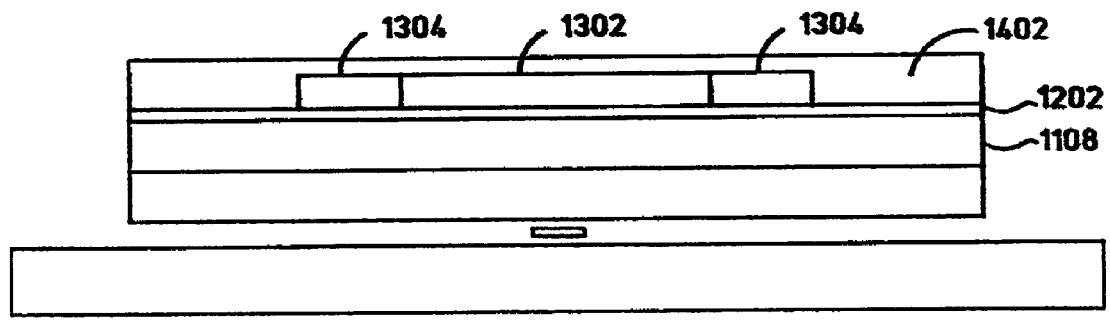
FIG. 14 is a fourth one of the several views of FIGS. 11-23, which is the same as FIG. 13 except that dielectric materials are formed thereover.

In FIG. 13, it is shown that an electrical device 1302 is then formed over gap layer 1202. Preferably, this electrical device 1302 is fabricated before the inductive coil of the write head. Electrical device 1302 will typically have a central or critical region and a side or peripheral region which may include electrical contacting regions 1304. In the present embodiment, electrical device 1302 is a thermal-assist heater for the magnetic head. In FIG. 14, it is shown that dielectric materials 1402 are deposited over electrical device 1302. Dielectric materials 1402 may be made of alumina ($Al_2O_3$) or other suitable non-conductive, non-magnetic materials. Dielectric materials 1402 are deposited to a thickness slightly greater than the thickness of electrical device 1302, such as between about 200 and 800 Angstroms.

Figure 15:
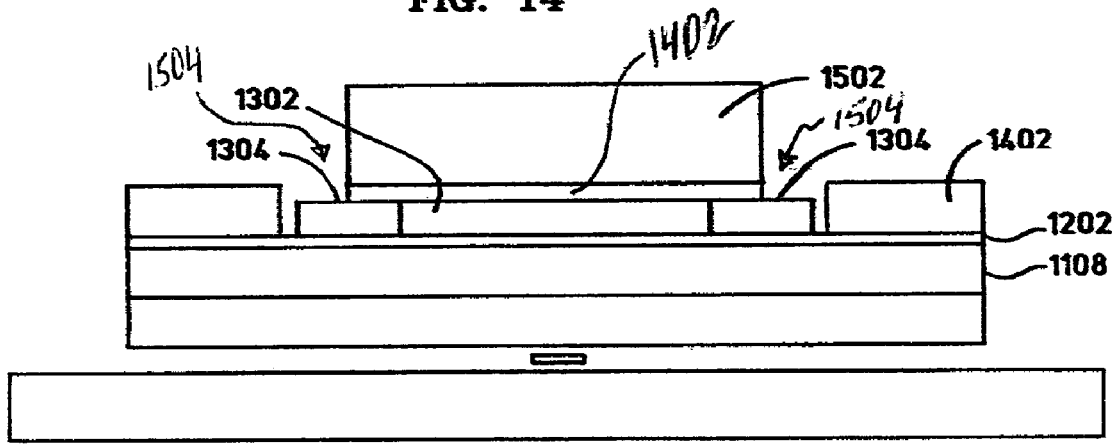
FIG. 15 is a fifth one of the several views of FIGS. 11-23, which is the same as FIG. 14 except that a portion of a second pole piece is formed thereover.
Figure 16:
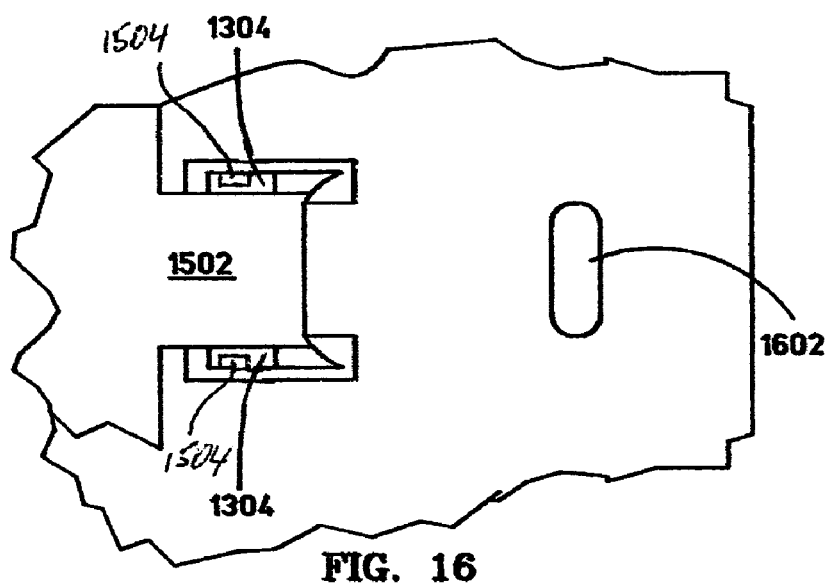
FIG. 16 is a sixth one of the several views of FIGS. 11-23, which is the same as FIG. 15 except that it is a top down view.

In FIG. 15, it is shown that a P1 pedestal 1502 is plated above electrical device 1302 on top of dielectric materials 1402 which have been etched to form vias 1504 to electrical contacting regions 1304. As apparent, dielectric materials 1402 below P1 pedestal 1502 serve to isolate P1 pedestal 1502 from electrical device 1302. Back gap pole materials (not visible in FIG. 15), which ultimately help connect the first pole piece (i.e. P1 pedestal 1502 and first pole piece layer 1108) to the second pole piece, are also plated in this same processing step. P1 pedestal 1502 and the back gap pole materials may be made of any suitable magnetic material, preferably one with a high magnetic moment, such as various compositions of NiFe alloys, CoFe alloys, or FeAlN, with the inclusion of other common additives or dopants to control its material properties. The structure of FIG. 15 is shown in a top down view in FIG. 16.

Figure 17:
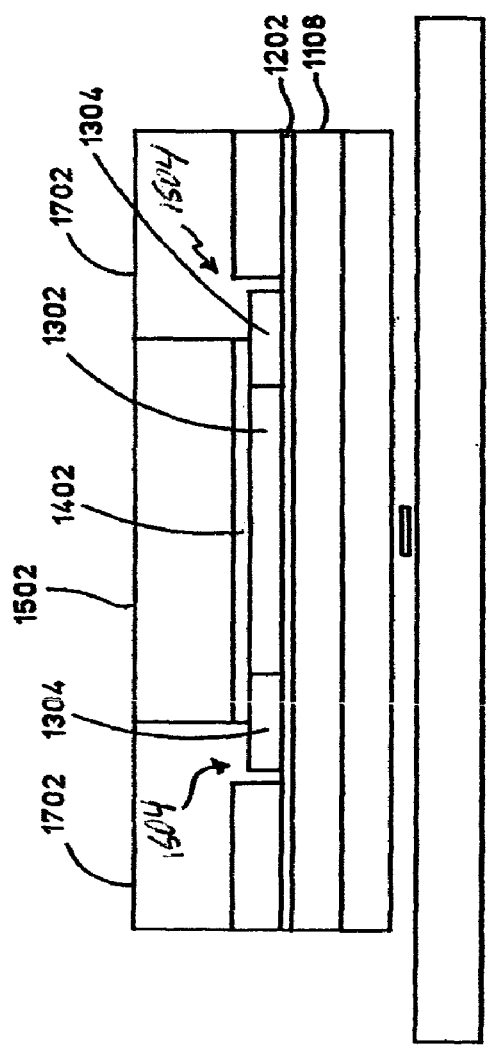
FIG. 17 is an seventh one of the several views of FIGS. 11-23, which is the same as FIG. 15 except that a photoresist structure for forming write coils is formed around the second pole piece portion and hard-baked into a hard-bake resist.

Next, a damascene process is utilized to simultaneously form a write coil and an electrical connection to electrical device 1302. The "fill" material may be, for example, photoresist materials (e.g. Novolak) which are spun-on top of the structure of FIGS. 15-16 and hard-baked until fully cross-linked. The top of the structure may then be planarized using a chemical-mechanical polishing (CMP) or other suitable process, resulting in the structure of FIG. 17. As shown in FIG. 17, a hard-baked resist 1702 is provided around P1 pedestal 1502 and over electrical contacting regions 1304 of electrical device 1302. From the CMP, tops of hard-baked resist 1702 and P1 pedestal 1502 are made coplanar.

Figure 18:
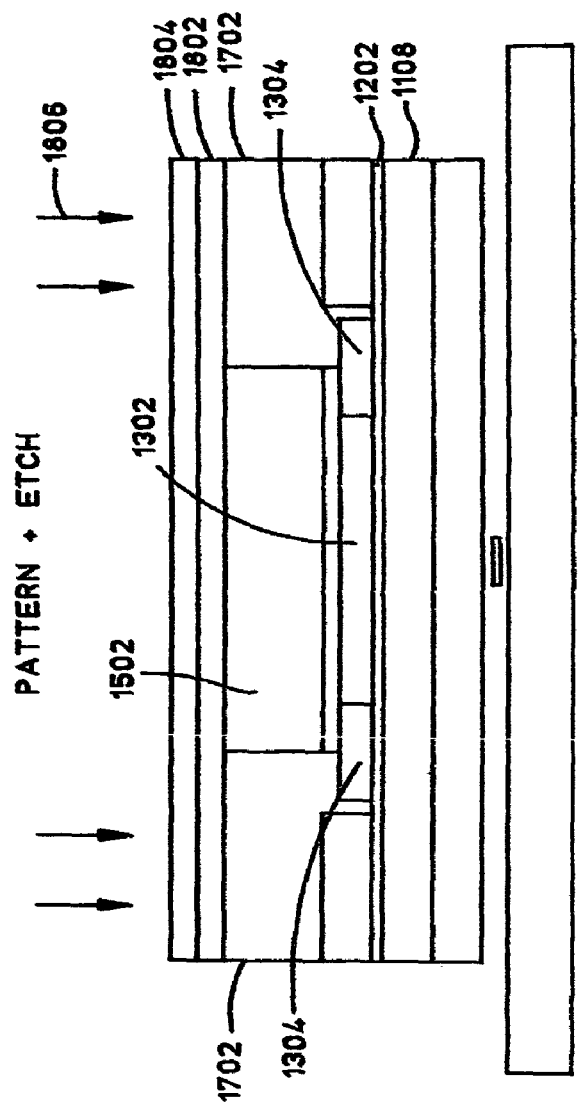
FIG. 18 is an eighth one of the several views of FIGS. 11-23, which is the same as FIG. 17 except that a dielectric layer and photoresist layer is formed thereover.
Figure 19:
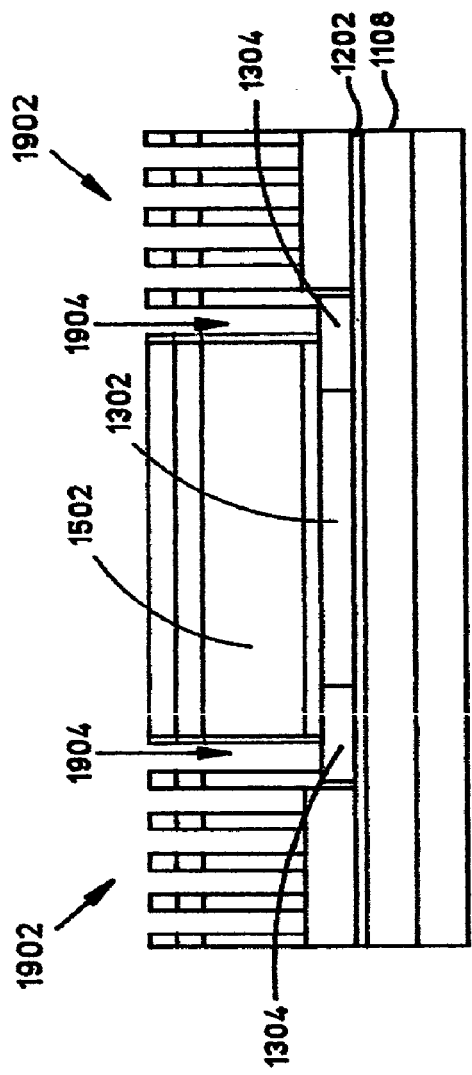
FIG. 19 is a ninth one of the several views of FIGS. 11-23, which is the same as FIG. 18 except that a write coil pattern and electrical connection pattern is etched into the photoresist layer, the dielectric layer, and the hard-bake resist.

In FIG. 18, it is shown that a dielectric layer 1802 (e.g. $Ta_2O_5$ or $SiO_2$) and a photoresist layer 1804 are subsequently deposited over the structure, in that order. Advantageously, these are relatively thin layers, between about 400-2000 Angstroms. A suitable write coil pattern and electrical connection pattern are then simultaneously transferred into photoresist layer 1804, dielectric layer 1802, and hard-baked resist 1702. This patterning is followed by an etching process 1806 to simultaneously etch the write coil pattern and electrical connection pattern through photoresist layer 1804, dielectric layer 1802, and hard-baked resist 1702. The resulting structure is shown in FIG. 19, revealing a plurality of coil layer trenches 1902 (formed between surrounding dielectric coil separating layers) and electrical connection vias 1904.

Figure 20:
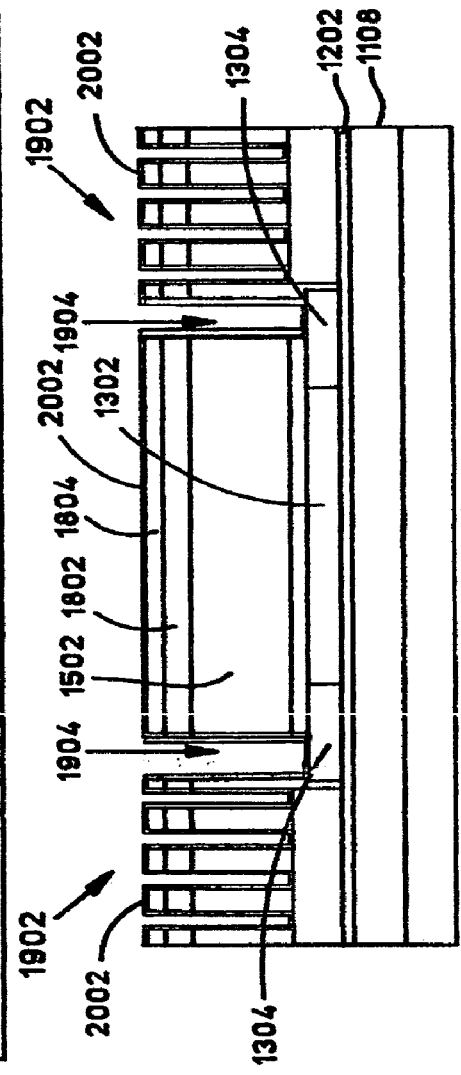
FIG. 20 is a tenth one of the several views of FIGS. 11-23, which is the same as FIG. 19 except that a multi-layered seed layer is formed thereover.
Figure 21:
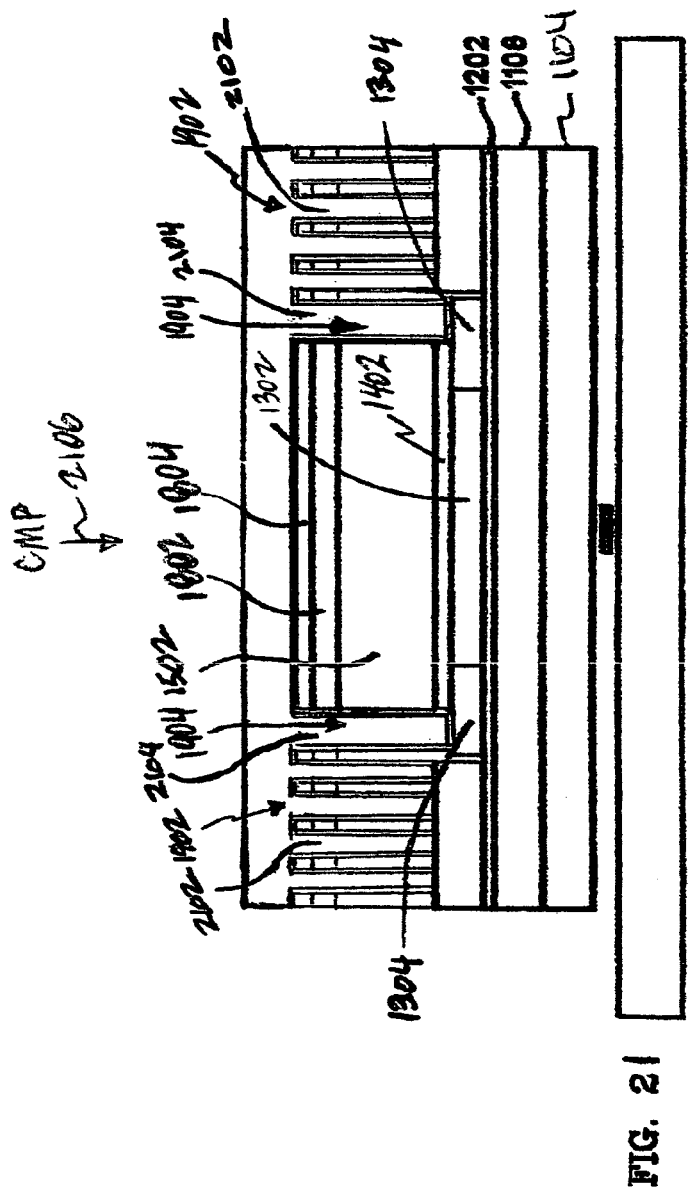
FIG. 21 is an eleventh one of the several views of FIGS. 11-23, which is the same as FIG. 20 except that coil layer and electrical connection materials are electroplated into the etched write coil and electrical connection pattern ("super-filling")

In FIG. 20, it is shown that a relatively thin seed layer 2002 is then deposited over the entire structure. Preferably, seed layer 2002 is a conformal layer which may have a thickness of between about 400-1000 Angstroms. In FIG. 21, it is shown that write coil materials 2102 and electrical connection materials 2104 are then electroplated into the plurality of coil layer trenches 1902 and electrical connection vias 1904. As shown, materials 2102 and 2104 are formed well above and over the entire structure. Write coil and electrical connection materials 2102 and 2104 are in fact the same materials, preferably copper (Cu). Thus, damascene copper electroplating is preferably utilized to simultaneously form the write coil and electrical connection. This leads to what is referred to as a robust "superfilling", to leave substantially void-free and seamless deposits within the defined trenches and vias.

Figure 22:
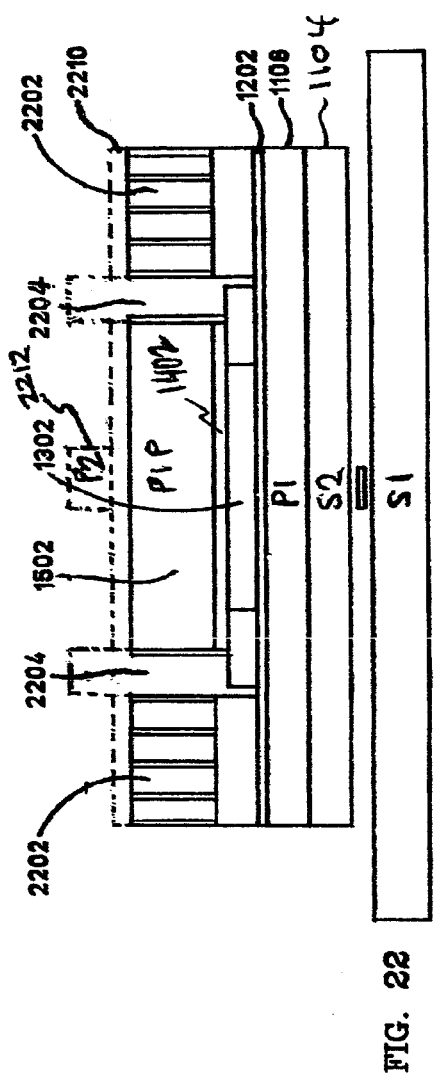
FIG. 22 is a twelfth one of the several views of FIGS. 11-23, which is the same as FIG. 21 except that a planarization process is performed thereover.
Figure 23:
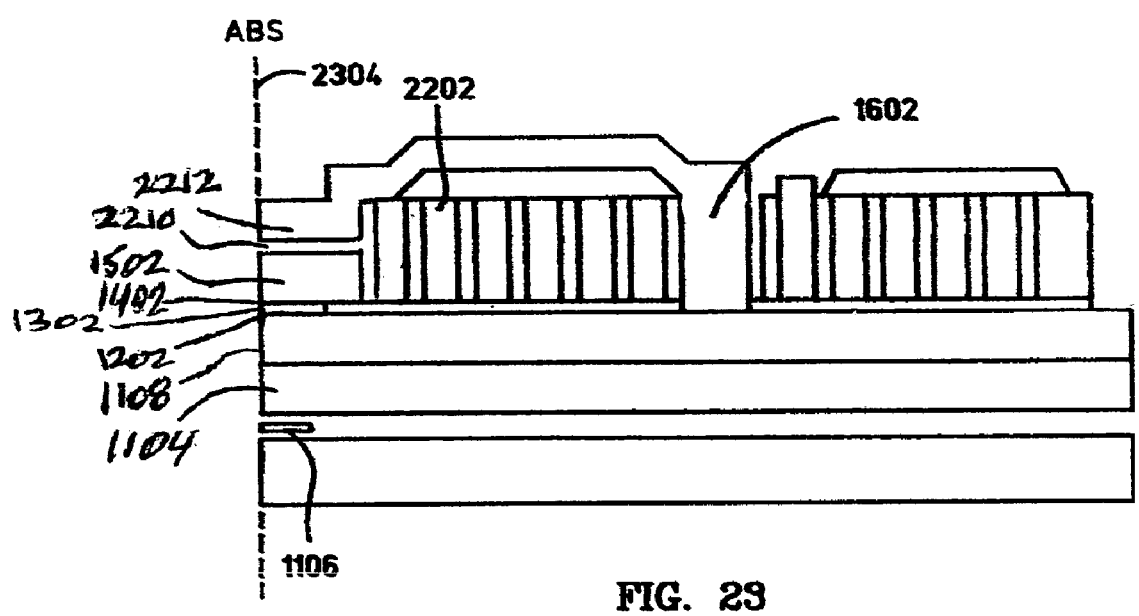
FIG. 23 is a thirteenth and final one of the several views of FIGS. 11-23, which is the same as FIG. 22 except that it is a cross-sectional view.

The top of the structure in FIG. 21 is subsequently planarized, using a CMP 2106 or other suitable process, sufficient to remove dielectric layer 2002 to result in the structure of FIG. 22. In FIG. 22, it is shown that electrical connections 2204 and a plurality of coil layers 2202 for the write coil are thereby formed. Note that electrical connections 2204 are continuous at least until the same level as coil layers 2202. Surrounding each coil layer 2202 and electrical connections 2204 are separating layers made of the hard-bake resist. Thus, coil layers 2202, electrical connections 2204, and P1 pedestal 1502 are electrically isolated from each other as illustrated in FIGS. 21-22. The relative orientation and separation may vary between the connections.

Additional conventional steps may complete formation of the magnetic head. After CMP 2106 of FIG. 21, for example, an additional pole layer may be formed on top of P1 pedestal 1502 via deposition and etching. As another example, one or more additional layers of write coils may be subsequently formed as an option. Furthermore, a write gap layer 2210 and an additional pole piece 2212 (e.g. a second pole piece "P2") shown in dashed lines in FIG. 22 may be subsequently formed over the structure. Additional pole piece 2212 ("P2") is coupled in the back gap region to the first pole piece, which is more clearly depicted in the cross-sectional view of FIG. 23. Although electrical device 1302 (e.g. the thermal-assist heater) is viewable in the cross-section of FIG. 23, its electrical connections are not.

Electrical device 1302 is driven with use of a driver circuit (not shown) which is coupled to electrical device 1302 through electrical connections 2204. Preferably, electrical connections 2204 connect to external connection pads (not shown) which are exposed on a surface of the magnetic head; these connection pads are then used to connect to the driver circuit (e.g. through wiring). The driver circuit may include conventional circuitry such as CMOS logic devices, bi-polar devices, and amplifiers. If a separate driver circuit is utilized, it may utilize an alternating current (A/C) circuit or a bimodal current driver to avoid electron migration and device degradation. In an alternate embodiment, the driver circuit is connected to a disk motor or motor controller of the disk drive. The disk motor can serve as a current or voltage source that drives the electrical device 1302 if the power requirements are substantial. This latter case assumes that the power of the electrical device is small (e.g. less than 10%) of the disk motor during operation.

As stated earlier, electrical connections 2204 may be alternatively used to connect to any suitable electrical device other than a thermal-assist heater. For example, electrical connections 2204 may be used for coupling to an electrical device which is an electrical lapping guide (ELG). In manufacturing, a lapping stage which uses a conventional ELG typically involves an abrasive lapping surface which precisely laps or polishes the poletips and/or MR elements for multiple sliders. A desired height is necessary to make the magnetic heads capable of writing and reading data in an optimal fashion. To achieve this desired height, an ELG acts as a lapping monitor element which varies in resistance relative to the proximity of the lapping surface. In contrast to the thermal-assist heater which is formed prior to and underneath the write coil, an ELG is formed subsequent to and over the write coil with the electrical connections extending upwards to it. After appropriate lapping, the ELG and its associated support portion are removed and not included as part of any slider or magnetic head.

Final Comments. Thus, methods for use in making a magnetic head have been described. The method may include the steps of forming a plurality of coil layers of a write coil using a damascene process; and simultaneously forming an electrical connection to an electrical device other than a read sensor in the same damascene process used to form the write coil. The electrical device may be any suitable electrical device for the magnetic head, such as a thermal-assist heater or an electrical lapping guide (ELG).

It is to be understood that the above is merely a description of preferred embodiments of the invention and that various changes, alterations, and variations may be made without departing from the true spirit and scope of the invention as set for in the appended claims. For example, although the method in relation to FIGS. 11-22 describes details pertaining to a longitudinal magnetic recording head design (LMRD), it will be apparent to those ordinarily skilled in the art and appreciated that the method is applicable to a perpendicular magnetic recording head design (PMRD) as well. Few if any of the terms or phrases in the specification and claims has been given any special particular meaning different from their plain language meaning, and therefore the specification is not to be used to define terms in an unduly narrow sense.

What is claimed is:

1. A method for use in making a magnetic head, comprising:
   forming a plurality of coil layers of a write coil using a damascene process; and
   simultaneously forming, in the same damascene process used to form the write coil, an electrical connection separate and apart from the write coil for connection to an electrical device other than a read sensor.

2. The method of claim 1, wherein the act of forming the electrical connection comprises an electrical connection for an electrical device comprising a thermal-assist heater.

3. The method of claim 1, wherein the act of forming an electrical device comprises forming an electrical lapping guide (ELG).

4. The method of claim 1, wherein the electrical device is formed prior to and under the plurality of coil layers.

5. The method of claim 1, wherein the electrical device is formed subsequent to and over the plurality of coil layers.

6. The method of claim 1, wherein prior to the damascene process used to simultaneously form the plurality of coil layers and the electrical connection, the method further comprises:
   forming a first pole piece over which the write coil and the electrical device are formed.

7. The method of claim 1, wherein the damascene process further comprises:
   forming a resist;
   patterning a write coil pattern and electrical connection pattern in the resist;
   etching into the resist in accordance with the write coil pattern and electrical connection pattern; and
   electroplating conductive materials into the etched resist, to thereby form the write coil and the electrical connection in accordance with the write coil pattern and electrical connection pattern.

8. The method of claim 1, wherein the electrical device comprises a thermal-assist heater and the damascene process comprises:
   forming a resist;
   patterning a write coil pattern and electrical connection pattern in the resist;
   etching into the resist in accordance with the write coil pattern and electrical connection pattern; and
   electroplating conductive materials into the etched resist, to thereby form the write coil and the electrical connection in accordance with the write coil pattern and electrical connection pattern.

9. A method for use in making a magnetic head, comprising:
   forming a thermal-assist heater;
   forming a plurality of coil layers of a write coil using a damascene process; and
   simultaneously forming, in the same damascene process used to form the write coil, at least part of a heater electrical connection separate and apart from the write coil for connection to the thermal-assist heater.

10. The method of claim 9, wherein the plurality of coil layers and the heater electrical connection are formed with the same material.

11. The method of claim 9, wherein the plurality of coil layers and the heater electrical connection comprise copper.

12. The method of claim 9, further comprising:

prior to forming the thermal-assist heater, forming a first pole piece over which the thermal-assist heater and the write coils are formed.

13. The method of claim 9, wherein the damascene process comprises:
forming a resist;
patterning a write coil pattern and electrical connection pattern in the resist;
etching into the resist in accordance with the write coil pattern and electrical connection pattern; and
electroplating conductive materials into the etched resist to form the plurality of coil layers and the at least part of the heater electrical connection in accordance with the write coil pattern and the electrical connection pattern, respectively.

14. The method of claim 9, further comprising:
prior to forming the plurality of coil layers of the write coil:
forming a first pole piece of a write head;
forming a write gap layer over the first pole piece; and
forming the thermal-assist heater over the write gap layer.

15. The method of claim 9, further comprising:
prior to forming the plurality of coil layers of the write coil:
forming a first pole piece of a write head;
forming a write gap layer over the first pole piece;
forming the thermal-assist heater over the write gap layer;
forming a dielectric layer over the thermal-assist heater;
forming a pedestal over the dielectric layer;
wherein the damascene process comprises the acts of:
forming a resist over the dielectric layer and around the pedestal;
patterning a write coil pattern and electrical connection pattern in the resist;
etching into the write coil pattern and electrical connection pattern of the resist; and
electroplating materials into the etched write coil pattern and electrical connection pattern to simultaneously form the plurality of coil layers and the at least part of the heater electrical connection.

16. A method for use in making a magnetic head, comprising:
forming a first pole piece of a write head;
forming a write gap layer over the first pole piece;
forming a thermal-assist heater over the write gap layer;
after forming the thermal-assist heater, forming a plurality of coil layers of a write coil using a damascene process; and
simultaneously forming, in the same damascene process used to form the write coil, at least part of a heater electrical connection to the thermal-assist heater.

17. The method of claim 16, further comprising:
prior to forming the plurality of coil layers of the write coil:
forming a dielectric layer over the thermal-assist heater; and
forming a pedestal over the dielectric layer.

18. The method of claim 17, wherein the damascene process comprises the acts of:
forming a resist over the dielectric layer and around the pedestal;
patterning a write coil pattern and electrical connection pattern in the resist;
etching into the write coil pattern and electrical connection pattern of the resist; and
electroplating materials into the etched write coil pattern and electrical connection pattern to simultaneously form the plurality of coil layers and the at least part of the heater electrical connection.

* * * * *